United States Patent [19]

Liepe

[11] Patent Number: 4,808,906
[45] Date of Patent: Feb. 28, 1989

[54] HIGH VOLTAGE REGULATOR FOR CRT ANODE VOLTAGE SUPPLY

[75] Inventor: Steven F. Liepe, Tualatin, Oreg.

[73] Assignee: Tektronix, Inc., Beaverton, Oreg.

[21] Appl. No.: 182,272

[22] Filed: Apr. 15, 1988

[51] Int. Cl.[4] .............................................. G05F 1/613
[52] U.S. Cl. ..................... 323/223; 323/233; 323/285; 323/299; 358/190
[58] Field of Search ............... 323/223, 233, 282, 284, 323/285, 293, 299; 358/190

[56] References Cited

U.S. PATENT DOCUMENTS

| | | | |
|---|---|---|---|
| 3,323,037 | 5/1967 | Doss | 323/284 |
| 4,041,355 | 8/1977 | Onodera | 358/190 |
| 4,073,003 | 2/1978 | Chambers | 363/21 |
| 4,679,131 | 7/1987 | Filliman | 358/190 |
| 4,774,584 | 9/1988 | Schmadal | 358/190 |

Primary Examiner—Patrick R. Salce
Assistant Examiner—Jeffrey Sterrett
Attorney, Agent, or Firm—William O. Geny

[57] ABSTRACT

A voltage regulator for an anode voltage supply in a CRT powered by a deflection flyback pulse generator includes a voltage sensing network for providing a feedback signal to a summing amplifier. A pulse sensing network which may be a capacitive divider is connected between the output of the flyback pulse generator and the input to the summing amplifier. The resultant output of the summing amplifier is the flyback pulse level shifted with respect to a DC level which is applied to a MOSFET switch to turn it on whenever the flyback pulse goes above the MOSFET's threshold. The output of the MOSFET switches current through a shunt capacitor coupled to the output of the deflection flyback pulse generator for altering its capacitance thereby regulating the height of the flyback pulses, and thus regulating the anode voltage supply.

12 Claims, 2 Drawing Sheets

HIGH VOLTAGE REGULATOR FOR CRT ANODE VOLTAGE SUPPLY

BACKGROUND OF THE INVENTION

The following invention relates to a high voltage regulator for the anode voltage supply of a CRT which is powered by a deflection flyback pulse generator.

The anode voltage supply for a color CRT, which is usually on the order of 20,000 volts, is maintained by utilizing the high voltage pulse output of a deflection flyback pulse generator and developing a DC voltage from these pulses by using a high voltage transformer and a large storage capacitor. Variations in brightness of the screen, however, can alter the voltage of the power supply, and this in turn can cause a change in the actual screen dimensions (horizontal and vertical). For example, if the data signal calls for a very bright screen, the beam current goes up which can deplete the anode voltage supply. The electron beam can then be deflected with less energy so the screen tends to become larger. One could reduce the deflection voltage to reduce the horizontal scan but that would only effect the horizontal dimension.

In the past, anode voltage supplies powered by the deflection flyback pulse generator have either been unregulated, or a separate regulated power supply has been used for the anode voltage which was not powered by the deflection flyback pulse generator. The use of two separate power supplies is obviously more costly and consumes more space within the chassis. A desirable feature would therefore be a voltage regulator for compensating the flyback deflection pulse generator for voltage drops caused by variations in anode beam current without the requirement for a separate power supply.

SUMMARY OF THE INVENTION

The invention herein provides a high voltage regulator for use in a CRT anode voltage supply powered by a deflection flyback pulse generator, and includes a voltage sensing network connected to the output of the voltage supply for providing a feedback signal indicative of its voltage output. A capacitive divider is connected to the output of the deflection flyback pulse generator for deriving a signal representative of the shape and timing of the deflection flyback pulses. The feedback signal from the voltage sensor and the output of the capacitive divider are summed in an error amplifier for producing an error signal in the form of a level-shifted version of the flyback pulse. The output of the error amplifier pulse width modulates the timing of an electronic switch whose output alters the amount of current through a shunt capacitor connected to the output of the flyback pulse generator thereby altering the level of its voltage peaks. Altering the voltage peaks directly alters the high voltage anode supply.

The electronic switch may be an enhancement mode N channel MOSFET which turns on at a predetermined threshold voltage. The output of the error amplifier is a DC level with the deflection flyback pulse riding on top of it. Since the deflection flyback pulse is a triangular waveform, the position of the DC level relative to the switching threshold of the MOSFET controls the amount of time that the MOSFET is on. This in turn controls the amount of current through the shunt capacitor.

The feedback loop includes a high voltage feedback resistor which provides a signal representative of the DC level of the power supply for the anode voltage. In one embodiment of the invention, a feed forward loop anticipates voltage variations in the voltage supply and is AC coupled to a feedback amplifier for improving the bandwidth of the loop.

It is a principal object of the invention to provide a voltage regulator for an anode voltage supply powered by deflection flyback pulses which compensates the voltage supply for variations in beam current without calling for a separate additional power supply.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
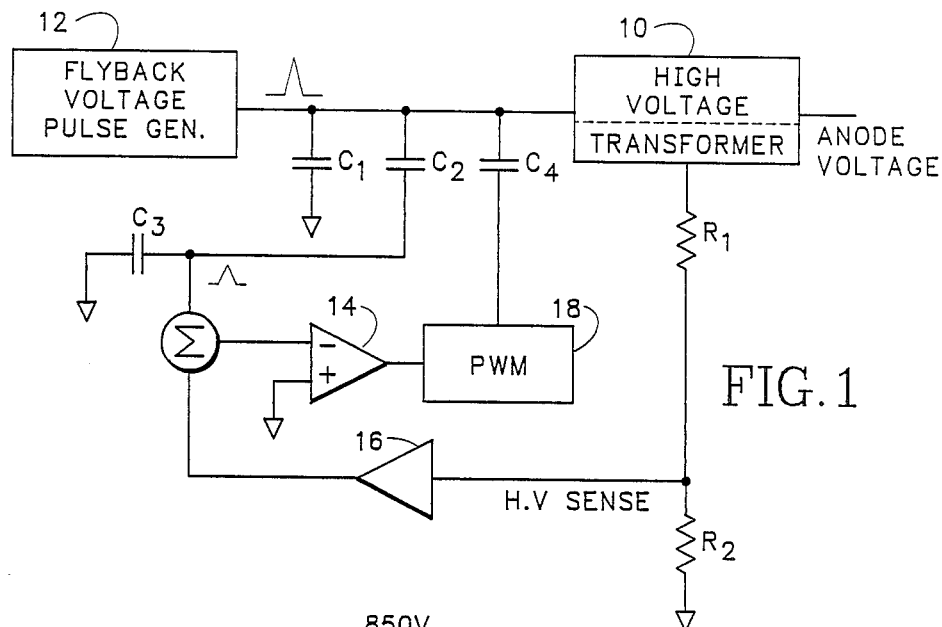
FIG. 1 is a block schematic diagram of the voltage regulator circuit of the present invention.

A high voltage supply transformer for providing an anode voltage for a CRT is powered by a flyback deflection pulse generator 12. The output of the flyback pulse generator 12 is connected to a tuning capacitor C1 and to a capacitive divider consisting of C2 and C3. The output of the divider is connected to an error amplifier 14 at a summing node 20 which has as its other input, the output of a feedback amplifier 16. The input to amplifier 16 is connected to voltage sensing resistors R1 and R2. The output of the error amplifier 14 is connected to a pulse width modulator 18 which controls current flowing into capacitor C4.

The output of the pulse generator 12 is a peaked triangular waveform which is converted to a DC voltage in the high voltage supply 10. This voltage is sensed by resistors R1 and R2 and buffered by feedback amplifier 16. A pulse representative of the flyback pulse is summed with the output of feedback amplifier 16 and referenced to ground in error amplifier 14. The resultant output of error amplifier 14 is a DC level with the flyback pulse riding on top of it. The pulse width modulator 18 is an electronic switch which is turned on when voltage at its input rises above threshold. When the pulse width modulator 18 is on, it causes current to flow through C4 thereby altering the voltage peaks of the flyback pulses from pulse generator 12.

Figure 2:
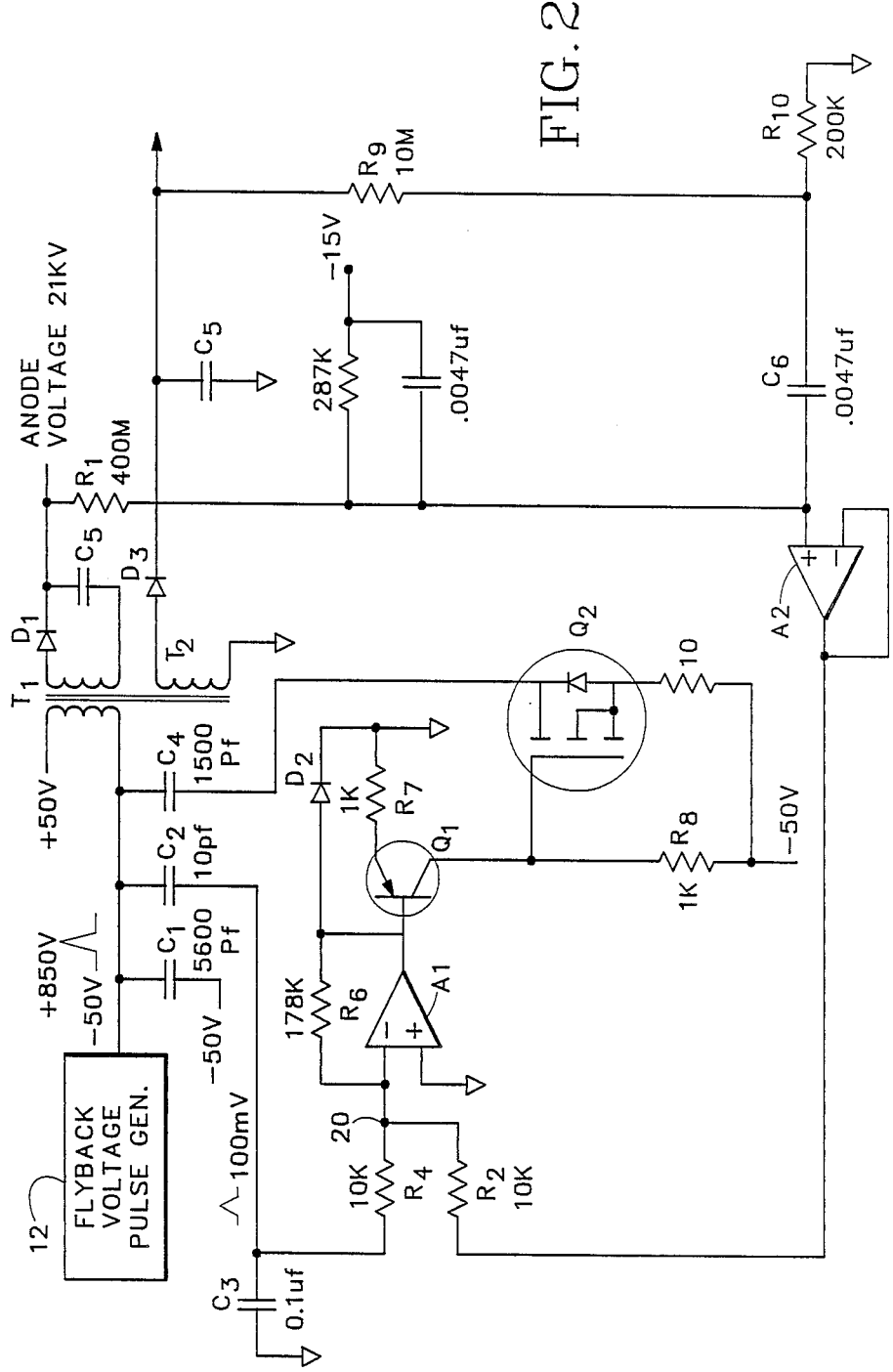
FIG. 2 is a detailed schematic diagram of the circuit illustrated in FIG. 1.

A more detailed schematic diagram is shown in FIG. 2. The high voltage power supply includes a transformer T1, a diode D1 and a storage capacitor C5. The sensing resistor R1 is coupled to the "plus" input of feedback amplifier 16. The output of amplifer 16 is connected to a summing resistor R2 which is connected to the "minus" input of amplifier A1 at a summing node 20. The output of the capacitive divider which is connected between C2 and C3 is connected to a second summing resistor R4, also connected to node 20 which is coupled to the negative input of amplifier A1. The output of amplifier A1, which includes gain setting resistor R6, is connected to the base of transistor Q1 which includes a protection diode D2 and a gain setting resistor network comprising R7 and R8. The collector of Q1 is connected to the gate of an enhancement mode N-channel MOSFET, Q2. The drain of Q2 is then connected to shunt capacitor C4.

A feed forward loop which is used to improve the loop bandpass and reduce geometric distortion, which may be caused by the high voltage regulation network, comprises a coil T2 connected to diode D3 and filter capacitor C15. A resistor R9 and a coupling capacitor C6 AC couple the output of T2 to the positive input of feedback amplifier A2. This allows the amplifier A2 to anticipate shifts in the DC voltage level sensed at R1 and R2 and compensate for those changes thus allowing the system to respond more quickly, hence there is a higher loop bandwidth and less geometric distortion.

Figure 3:
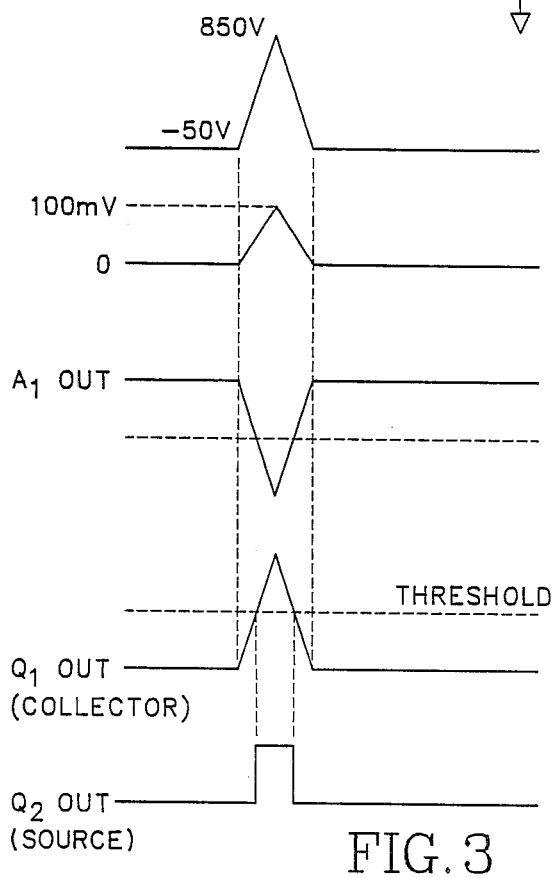
FIG. 3 is a waveform diagram illustrating the operation of the circuit of FIG. 2.

The operation of the circuit of FIG. 2 is illustrated in the waveform diagram of FIG. 3. The deflection flyback pulse is a triangular waveform which has a peak of 850 volts and is referenced to 50 volts below ground. The capacitive divider provides a pulse representing the deflection flyback pulse, that is, it has the same shape and timing, but is only 100-millivolts peak to peak. When this PWM (Pulse Width Modulation) waveform is summed with the output of feedback amplifier A2 at the summing node 20, an output is created at A1 which is, in essence, the DC level of A2 with the PWM waveform riding on top of it. This output is level shifted in Q1 and applied to the gate of MOSFET switch Q2. The degree to which the flyback pulse has a level above the threshold of Q2 is determined by the DC output of A2. Since the deflection flyback pulse is triangular, this in turn determines the length of time that Q2 is turned on. Thus, the output of amplifier A1 and transistor Q1 effectively pulse width modulates the switching action of Q2. This, in turn, alters the amount of current flowing through capacitor C4 which affects the height of the deflection flyback pulse, thus compensating for the voltage variation of the anode voltage supply due to load changes in the form of beam current variation.

For example, if there is a load increase due to the demand for a brighter screen, the anode voltage will decrease, less DC voltage is sensed at R2 and, hence, the output of A2 goes lower. When A2 goes lower, the output of A1 goes higher. Q1 inverts the output of A1 moving the flyback pulse lower relative to the threshold of MOSFET Q2. When the flyback pulse is moved lower relative to the MOSFET threshold, the FET is on less time and there is therefore less current directed into shunt capacitor C4. With less current flowing into shunt capacitor C4, the peak of the deflection flyback voltage pulse goes higher, which causes the anode voltage to increase.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. In a cathode ray tube anode voltage supply comprising a deflection flyback pulse generator coupled to a high voltage transformer network, a voltage regulator, comprising:
   (a) a capacitive divider connected to an output of said pulse generator;
   (b) a summing amplifier coupled to said capacitive divider;
   (c) feedback circuit means coupled between said high voltage transformer network and said summing amplifier for sensing the voltage output of said high voltage transformer network;
   (d) an electronic switching means connected to an output of said summing amplifier for producing variable width pulses wherein the width of each said pulse is a function of variations in voltage at the output of said high voltage transformer network; and
   (e) shunt means coupled to the output of said flyback pulse generator for altering the peak amplitude of pulses generated thereby in response to the output of said electronic switching means.

2. The voltage regulator of claim 1 wherein said feedback circuit means comprises a feedback resistor coupled to an amplifier for producing a signal representative of the voltage sensed by said feedback resistor.

3. The voltage regulator of claim 1 wherein said shunt means comprises a shunt capacitor.

4. The high voltage regulator of claim 3 wherein said electronic switching means comprises a MOSFET switch for providing current through said shunt capacitor when said switch is turned on.

5. The voltage regulator of claim 4 wherein said summing amplifier means comprises an error amplifier having a summing node coupled to the output of said capacitive divider and to said feedback circuit means, and a level shifting amplifier for shifting the absolute DC level of a pulse representative of the output of said deflection flyback pulse generator relative to the threshold of said switching means.

6. The voltage regulator of claim 1, further including a feed forward path comprising second voltage sensing means coupled to said high voltage transformer network and capacitively coupled to said feedback circuit means for increasing the bandwidth of said voltage regulator.

7. In a cathode ray tube anode voltage supply comprising a deflection flyback pulse generator coupled to a high voltage transformer network, a voltage regulator comprising:
   (a) voltage sensing means connected to the output of said high voltage transformer network for providing a feedback signal;
   (b) pulse sensing means responsive to deflection flyback pulses from said pulse generator for producing a signal representative of the shape and timing of said deflection flyback pulses;
   (c) error amplifier means for combining said feedback signal with the signal from said pulse sensing means and for producing an error signal in response thereto; and
   (d) pulse width modulation means responsive to said error signal for altering the voltage of said deflection flyback pulses.

8. The high voltage regulator of claim 7 wherein said pulse sensing means comprises a capacitive divider.

9. The high voltage regulator of claim 7 wherein said voltage sensing means comprises a high voltage resistor coupled to an amplifier.

10. The high voltage regulator of claim 9 wherein said voltage sensing means further comprises an AC-coupled feed-forward path comprising second voltage sensing means coupled to said high voltage transformer network and capacitively coupled to the input of said amplifier.

11. The voltage regulator of claim 10 wherein said error amplifier means comprises a summing amplifier having at its input a summing node coupled both to the output of said feedback amplifier and to the output of said capacitive divider, respectively, for producing a triangular pulse whose absolute DC level is shifted in accordance with the magnitude of the output of the feedback amplifier such that said error signal comprises a DC level with said signal 35 representative of said deflection flyback pulse riding on top of it.

12. The high voltage regulator of claim 11 wherein said pulse width modulation means comprises MOSFET switch means having a predetermined threshold voltage and a shunt capacitor coupled between said MOSFET and the output of said deflection flyback pulse generator.

* * * * *